L. S. HUGHES & C. H. WOLCOTT.
METHOD FOR TREATING FERRUGINOUS WATERS.
APPLICATION FILED SEPT. 8, 1914.
1,254,009. Patented Jan. 15, 1918.
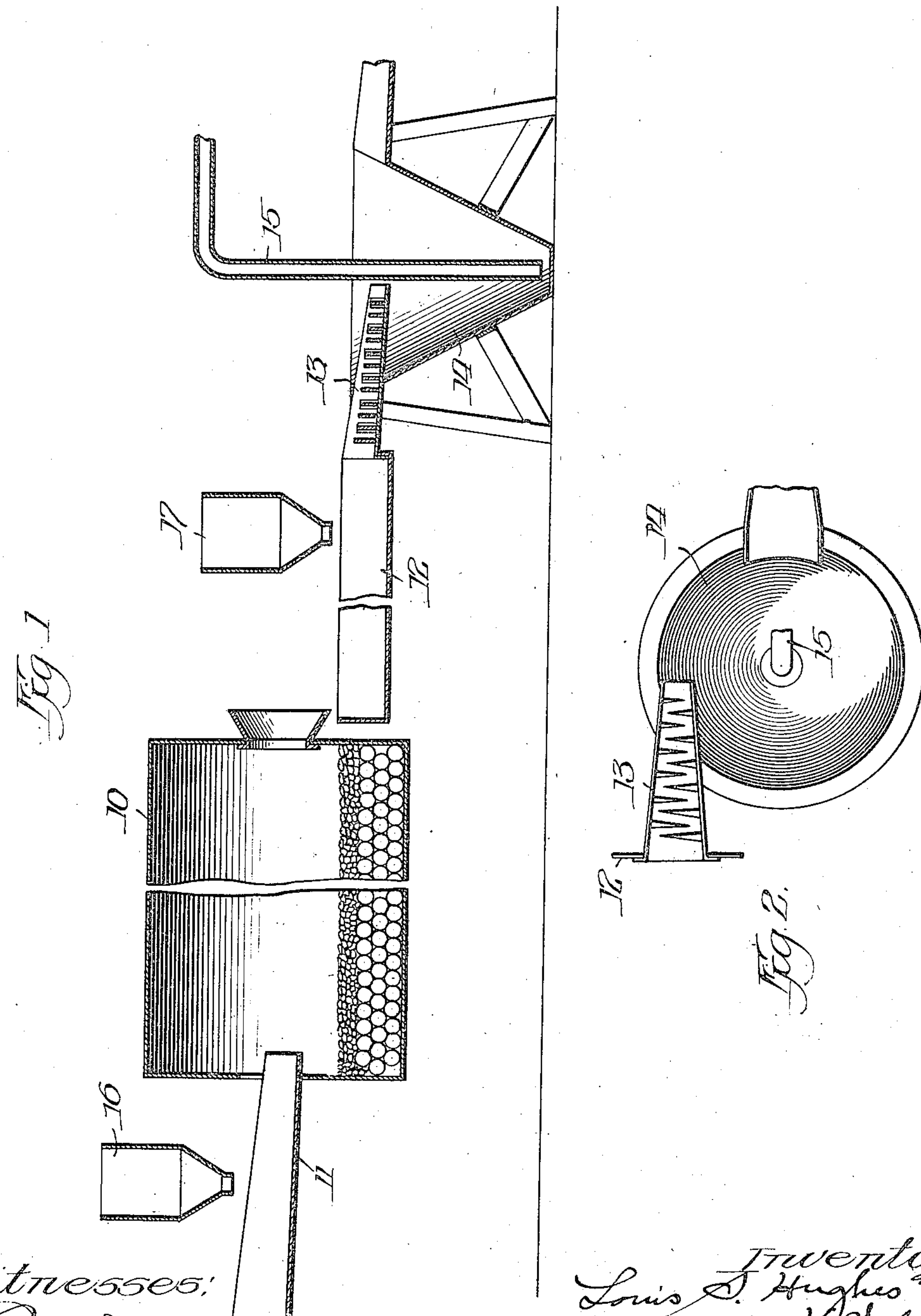

UNITED STATES PATENT OFFICE.

LOUIS S. HUGHES AND CLIFFORD H. WOLCOTT, OF CHICAGO, ILLINOIS.

METHOD FOR TREATING FERRUGINOUS WATERS.

1,254,009. Specification of Letters Patent. Patented Jan. 15, 1918.

Application filed September 8, 1914. Serial No. 860,569.

*To all whom it may concern:*

Be it known that we, LOUIS S. HUGHES and CLIFFORD H. WOLCOTT, citizens of the United States, and residents of Chicago, in the county of Cook and State of Illinois, have invented certain new and useful Improvements in Methods for Treating Ferruginous Waters, of which the following is a specification.

This invention relates to improvements in methods for treating acidulous water, such as mine water, wherein free sulfuric acid is present as well as metallic salts, such as sulfates of iron and aluminum, and, generally stated, the invention contemplates a method by which the acid constituent may be neutralized, whereby to render the water available for use for industrial purposes and also by which by-products may be recovered in merchantable form valuable for use in the mechanic arts.

More specifically set forth, the invention has to do with a method or process of the general character before referred to made the subject of a co-pending application for Letters Patent of the United States, filed by Louis S. Hughes under date of October 2, 1913, and bearing Serial No. 792,960. In that application is disclosed a method of treatment which embraces the utilization of a raw carbonate of an alkali earth, such as limestone, arranged in separated bodies to provide successive stages of treatment, the limestone of each body being in granular form and graduated in size so that the particles of each body will be relatively larger than the particles of the preceding body, and through these limestone bodies the acidulous water is progressively passed. During such passage the carbonate reacts on the acid constituents of the water to neutralize these acid constituents and form a precipitate in suspension, which precipitate, after leaving the limestone, is subjected to violent agitation in order to coagulate the same and thus enable the precipitate to settle in a proper pit and therefrom to be removed for such further treatment as may be necessary to render it commercially useful. We have found, however, that while the method or process in question is efficacious for neutralization of the acid content in the weaker acidulous waters and for the removal of ferric salts, the treatment afforded does not precipitate the ferrous salts, so that all the iron held by the water is not recovered. Furthermore, when strong acid water is treated by the method aforesaid it is difficult to obtain complete neutralization by the use only of limestone, an excess of calcium sulfate being produced which is partially precipitated with the iron salts and forms an undesirable ingredient for pigment production.

The main and primary object of the present invention, therefore, is the provision of a novel method for the treatment of acid water whereby the ferrous salts may be readily converted into ferric salts, and thus be rendered precipitable in order that the precipitate shall include all of the iron carried by the water.

Further, the invention also has in contemplation the provision of a method susceptible of treating strong acid water so as to obtain complete neutralization thereof, and, at the same time, to free the resultant precipitate from calcium sulfate. The precipitate, therefore, is highly useful for pigment production and is wholly free from objectionable ingredients.

A further object of the present invention is to eliminate the gradual incrustation of the carbonate employed as a precipitant, the limestone used under the conditions obtaining in the practice of the method of the previous application referred to being open to this objection.

Other objects and advantages of the invention will be apparent as the nature of the improvements is better understood, the invention consisting in the novel steps hereinafter fully described and recited in the appended claims, and while the adaptation of the invention as specified is believed at this time to be a preferred embodiment thereof, it is obvious that it is susceptible to various changes or modifications without departing from the spirit of the invention or sacrificing any of its advantages.

In the drawings:

Figure 1 is a diagrammatic view illustrating a form of apparatus for practising the herein-described invention.

Fig. 2 is a detail sectional plan view of the settling pit and the coagulating trough discharging thereinto.

As specified in the application hereinbefore referred to, the water to be treated is primarily that discharged or pumped from coal mines, and contains free sulfuric acid as well as metallic sulfates, but it is manifest that the method may be employed with other waters which it is desired to treat and from which it is also sought to extract the metallic content. No special apparatus is necessary for carrying into effect the present invention, but the accompanying drawings illustrate a schematic arrangement adapted for the purpose. In contradistinction to flowing the acidulous water over or through limestone bodies having a fixed status, such as disclosed in the aforesaid application, it is the purpose of the present invention to subject the water in its flow to the action of a body of limestone in granular form contained within a pulverizing device, such as a tubular ball mill. This is conventionally illustrated in the drawings and designated by the numeral 10, and is of sufficient size to contain the requisite quantity of the limestone for the proper treatment of the water as the latter passes through the mill. It, of course, also contains the necessary ball members so that, by the attrition of the latter against the limestone particles, a grinding action may be effected to produce a very fine limestone powder. This is taken up by the water, which is introduced by a trough 11 from the source of discharge of the water, and as the latter passes through the mill 10 it will be apparent that the powdered limestone will react to neutralize the acid contained in the water. A precipitate in suspension results. The water with the precipitate then passes into a collecting vat 12 wherein the flow of the water is partially retarded, and at which point the reaction may be observed, and from the collecting vat 12 the water and the suspended precipitate pass down an inclined trough 13 in which is arranged a series of transversely-extending baffles designed to impart violent agitation to the water and to the precipitate as the same pass from the vat 12. This agitation of the water serves to coagulate the suspended precipitate and prepares the same for settling when the water and the precipitate reach a conical pit 14 into which the coagulating trough 13 discharges. The discharge of the trough 13 into the pit 14 is tangential to the latter so that the water is given a whirling action in the pit and thus the precipitate is caused to settle at the bottom of the pit 14 from which it may be removed by a pipe 15 connected to a suitable pump line.

As before stated, the action of the limestone as a precipitant serves to precipitate the ferric salts contained in the water, but the ferrous salts are not susceptible to this action by the limestone. To convert the ferrous salts into precipitable form is one of the objects of this invention, and to the accomplishment of this end it is proposed to introduce into the acidulous water an oxidizing reagent through the medium of which the conversion referred to is effected. For this purpose the oxidizing reagent is preferably introduced into the water as it passes through the trough 11 to the mill 10, the numeral 16 designating a conventional form of feed device for so introducing the oxidizing reagent. Any of the well known reagents may be used for this purpose but it is preferred to employ a soluble hypochlorite such as calcium hypochlorite or bleaching powder. The effect of this, as is obvious, is to react on the ferrous salts to convert the same into ferric salts, and thus when the water enters the ball mill 10 and is subjected to the action of the carbonate therein, the converted salts are susceptible to precipitation by the carbonate. The hypochlorite being of a basic character also neutralizes its equivalent of the acid content of the water.

As also stated, the present invention contemplates the production of a precipitate which is free from calcium sulfate or gypsum. When treating water which is strong in acid it is commercially undesirable to complete neutralization by limestone alone, due to the fact that such a quantity of calcium sulfate is produced that it partially precipitates with the iron salts and forms an undesirable ingredient for pigment production. In such cases a precipitate free from gypsum may be obtained by limiting the treatment with lime compounds to such a point that the gypsum produced does not exceed the amount which will remain in solution and by completing the neutralization with calcined magnesite. To this end it is proposed to introduce the magnesite at the point where the gypsum begins to manifest itself in the precipitate and before deposit of the precipitate in the settling pit, and in order that this may be done the magnesite may be introduced, as by a feed device 17, to the water in the collecting vat 12, which vat, by reason of its location in proximity to the mill 10 and between the latter and the coagulating trough 13, will retard the flow of the water and the suspended precipitate for a sufficient period to permit observation and inspection of the precipitate from time to time. When the magnesite is so introduced neutralization is completed and the precipitate contains no gypsum. The produced magnesium sulfate does not precipitate because of its high solubility.

From the foregoing the operation of the herein-described process will be readily seen, and, briefly stated, is as follows: The acid water as it flows or is pumped from the mine passes through the trough 11 and is discharged thereby into the mill 10. This being in operation, the crushing balls act upon the limestone particles to gradually reduce the same to a powder which, acting upon the acid water, will neutralize the acids in the water and produce a precipitate in suspension. This precipitate is colloidal in form and as the precipitate is discharged into the collecting vat 12 the flow of the water is retarded for a brief period to permit the further spontaneous formation of the precipitate in the water. At the same time this retarding of the flow enables determination of the character of the precipitate and if it be found that gypsum is manifesting itself the proper steps may be taken to limit the action of the limestone and to feed into the water a proper amount of magnesite for the purpose of eliminating the gypsum. From the collecting vat 12 the water passes through the inclined coagulating trough 13, in which passage the water and the precipitate are subjected to agitation so that the minute particles of the precipitate are massed together to thereby coagulate the precipitate, whereupon the water and the precipitate are discharged into the settling pit 14, which discharge is attended by a whirling action of the water in the pit for settling of the precipitate therein. The precipitate may be pumped from the pit 14 through the pipe 15 and the water, freed of the precipitate, may then pass out of the pit 14 in its purified state.

As before set forth, the ferric salts will be precipitated by the limestone, but to convert the ferrous salts into ferric salts in order to accomplish precipitation of the former, an oxidizing reagent is discharged into the trough 11 from the feed device 16 so that the acid water may be introduced into the mill 10 charged with this oxidizing reagent.

The herein-described process is primarily designed for the production of a pigment and in the formation of the latter it is highly desirable that the same shall be free of calcium sulfate. This result is obtained by the magnesite. By controlling the operation of the ball mill the quantity of pulverized stone gradually produced therein may be limited to the amount required to neutralize the acid constituents of the water so that the precipitate is substantially free from limestone. If more limestone be pulverized than is required for neutralization, the excess thereof will be collected with the precipitate and contaminate the same. This is undesirable and the production of pulverized limestone may be nicely regulated to the desired amount by controlling the operation of the ball mill, as above indicated.

Having thus described the invention, what is claimed as new and desire to be secured by Letters Patent is:

1. The method of treating ferruginous water, which consists in subjecting the water to the action of an oxidizing reagent to convert the ferrous salts into ferric salts to render the total iron content of the water precipitable, then commingling the water and a reagent having alkaline characteristics, agitating the water and the last-mentioned reagent while in the presence of each other to neutralize the free acid content of the water and form a precipitate in suspension, and then recovering the precipitate.

2. In the method of treating ferruginous water the step which consists in subjecting the water to the action of a soluble hypochlorite to convert the ferrous salts into ferric salts to render the total iron content of the water precipitable.

3. The method of treating ferruginous water, which consists in initiating neutralization of the acid content of the water by the action of a reagent capable also of rendering insoluble the precipitable metallic content and which forms a substantially insoluble salt with said acid content, and then completing neutralization and precipitation by subjecting the water to the action of a second reagent forming a readily soluble salt with said acid content.

4. The method of treating ferruginous water, which consists in initiating neutralization of the acid content of the water by the action of a reagent capable also of rendering insoluble the precipitable metallic content and which forms a substantially insoluble salt with said acid content, then completing neutralization and precipitation by subjecting the water to the action of a second reagent, and then recovering the precipitate.

5. The method of treating ferruginous water, which consists in initiating neutralization of the free acid of the water by the action of a reagent capable also of rendering insoluble the precipitable metallic content, and which forms a substantially insoluble salt with said acid, and then subjecting the water to the action of magnesite, whereby to complete neutralization.

6. The method of treating acid water, which consists in initiating neutralization of the acid content in the water by the action of a reagent capable also of precipitating the iron and aluminum in the water and which forms a substantially insoluble salt with said acid content, then completing the neutralization and precipitation by subjecting the water to the action of a second reagent forming a soluble salt with said acid content, and then recovering the precipitate.

7. The method of treating ferruginous water containing free sulfuric acid, which consists in initiating neutralization of the free acid by the action of limestone, whereby the iron content is precipitated and a relatively small amount of sulfate of calcium is formed, and then completing the precipitation and neutralization by subjecting the water to the action of an alkaline carbonate which forms a soluble sulfate with said acid and completes the precipitation of the iron.

8. The method of treating ferruginous water containing free sulfuric acid, which consists in initiating the neutralization of the free acid and the precipitation of the iron content by treating the water with limestone, and then completing the neutralization and precipitation by treating the water with magnesite.

9. The method of treating ferruginous water, which consists in subjecting the water to the action of an oxidizing agent to convert the ferrous salts into ferric salts, then subjecting the water to the action of limestone to partially neutralize the water and precipitate the iron as a ferric salt, and then completing the neutralization and precipitation by subjecting the water to the action of magnesite.

LOUIS S. HUGHES.
CLIFFORD H. WOLCOTT.

Witnesses:
CHARLES G. SPOERER,
WILLIAM F. SEIDLER.